United States Patent
Kim et al.

(10) Patent No.: US 10,268,305 B2
(45) Date of Patent: Apr. 23, 2019

(54) ELECTRONIC DEVICE AND METHOD OF CONTROLLING THE SAME

(71) Applicant: Samsung Electronics Co., Ltd., Suwon-si, Gyeonggi-do (KR)

(72) Inventors: Min-Soo Kim, Gumi-si (KR); Ji-Woo Lee, Gumi-si (KR); Young-Tae Jeong, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 309 days.

(21) Appl. No.: 15/153,269

(22) Filed: May 12, 2016

(65) Prior Publication Data

US 2016/0357317 A1 Dec. 8, 2016

(30) Foreign Application Priority Data

Jun. 4, 2015 (KR) .................. 10-2015-0079188

(51) Int. Cl.
  G06F 3/041 (2006.01)
  G06F 3/044 (2006.01)

(52) U.S. Cl.
  CPC ............ G06F 3/0416 (2013.01); G06F 3/044 (2013.01); *G06F 2203/04101* (2013.01); *G06F 2203/04105* (2013.01); *G06F 2203/04107* (2013.01)

(58) Field of Classification Search
  CPC combination set(s) only.
  See application file for complete search history.

(56) References Cited

U.S. PATENT DOCUMENTS

| | | | |
|---|---|---|---|
| 2011/0096024 A1* | 4/2011 | Kwak | G06F 3/044 345/174 |
| 2011/0193818 A1 | 8/2011 | Chen et al. | |
| 2013/0293489 A1* | 11/2013 | Shin | G06F 3/041 345/173 |
| 2014/0074426 A1 | 3/2014 | Hotelling et al. | |
| 2014/0097768 A1* | 4/2014 | Lee | G01B 7/14 315/313 |
| 2015/0091862 A1* | 4/2015 | Bertrand | G06F 3/044 345/174 |
| 2015/0130764 A1 | 5/2015 | Woolley et al. | |
| 2015/0185914 A1* | 7/2015 | Han | G06F 3/044 345/174 |
| 2015/0185958 A1* | 7/2015 | Park | G06F 3/0416 345/175 |

FOREIGN PATENT DOCUMENTS

KR   10-2010-0105555 A   9/2010
KR   10-2015-0010418 A   1/2015

* cited by examiner

*Primary Examiner* — Jennifer Mehmood
*Assistant Examiner* — Deeprose Subedi
(74) *Attorney, Agent, or Firm* — Jefferson IP Law, LLP

(57) ABSTRACT

An electronic device is provided. The electronic device includes a proximity sensor overlapping a portion of the touch screen to form an overlap area of the touch screen, and a processor configured to sense a proximity of an object located over the touch screen using the proximity sensor, change a proximity sensitivity of the overlap area of the touch screen, and sense a position of the object using the changed proximity sensitivity of the touch screen.

19 Claims, 16 Drawing Sheets

ELECTRONIC DEVICE AND METHOD OF CONTROLLING THE SAME

CROSS-REFERENCE TO RELATED APPLICATION(S)

This application claims the benefit under 35 U.S.C. § 119(a) of a Korean patent application filed on Jun. 4, 2015 in the Korean Intellectual Property Office and assigned Serial number 10-2015-0079188, the entire disclosure of which is hereby incorporated by reference.

TECHNICAL FIELD

The present disclosure relates to an electronic device. More particularly, the present disclosure relates to an electronic device including a touch screen and a method of controlling the electronic device.

BACKGROUND

Recently, various electronic devices used in a practical life are being modernized. In particular, following a rapid growth of a smart phone market, after some or all functions of a smart phone are added to various electronic devices used in a practical life, the various electronic devices are released.

Specifically, a smart phone may receive a touch input of a user through a touch screen. When a touch input of a user approaches the touch screen within a predetermined distance (e.g., 5 mm), the smart phone may detect a position over the touch screen, which corresponds to the touch input of the user.

In addition, the smart phone is operated to detect a proximity of an object using a proximity sensor.

In most electronic devices, an infrared ray (IR) sensor using infrared light is used as the proximity sensor.

In order to smoothly emit infrared light from a light source and receive reflected infrared light, the IR proximity sensor includes an IR filter, through which only infrared light is passed, on a transparent window glass of the smart phone.

As an example of a method of sensing a proximity of an object using the IR sensor, when infrared light emitted through a hole of an emitting unit is received through a hole of a sensing unit, the proximity of the object may be determined using information on a time when the emitted infrared light is received.

The above information is presented as background information only to assist with an understanding of the present disclosure. No determination has been made, and no assertion is made, as to whether any of the above might be applicable as prior art with regard to the present disclosure.

SUMMARY

As described above, an object proximity sensing technique using the infrared ray (IR) sensor may be used.

However, in order to include the IR proximity sensor, two holes having independent spaces are necessary to prevent interference of an emitting unit (e.g., an emitter) and a sensing unit (e.g., a detector). At this time, the two holes may limit a design of a front portion of an electronic device in manufacturing the electronic device.

In addition, when the proximity of the object is to be sensed using a touch screen rather than the IR sensor, the proximity of the object, which is far outside a sensing distance of the touch screen, may not be sensed, or a gesture according to a movement of the object may not be recognized.

Aspects of the present disclosure are to address at least the above-mentioned problems and/or disadvantages and to provide at least the advantages described below. Accordingly, an aspect of the present disclosure is to provide a method of sensing a proximity using a proximity sensor and a touch screen.

In accordance with an aspect of the present disclosure, an electronic device is provided. The electronic device includes a touch screen, a proximity sensor overlapping a portion of the touch screen to form an overlap area of the touch screen, and a processor configured to sense a proximity of an object located over the touch screen using the proximity sensor, change a proximity sensitivity of the overlap area of the touch screen, and sense a position of the object using the changed proximity sensitivity of the touch screen.

In accordance with another aspect of the present disclosure, an electronic device is provided. The electronic device includes a housing including a first surface and a second surface opposite to the first surface, a display exposed through the first surface, a touch panel that is disposed between the display and the second surface, the touch panel including a first electrode and a second electrode, wherein the touch panel calculates plane coordinates of a user input to the display based on a change of a capacitance formed between the first electrode and the second electrode, and a capacitive sensor including a third electrode and a fourth electrode, the capacitive sensor measuring a proximity between an external object and the first surface of the housing based on a change of a capacitance formed between the third electrode and the fourth electrode.

In accordance with another aspect of the present disclosure, a capacitive proximity sensor rather than an IR sensor is used, therefore a hole may not be included on a front window of a smart phone. Thus, a limit of a design may be reduced.

In accordance with another aspect of the present disclosure, a simple proximity recognition of an object using a capacitive proximity sensor is broke away, a proximity sensing performance of a touch screen is enhanced using a proximity sensor and a touch screen, and a position of an object may be more minutely measured.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
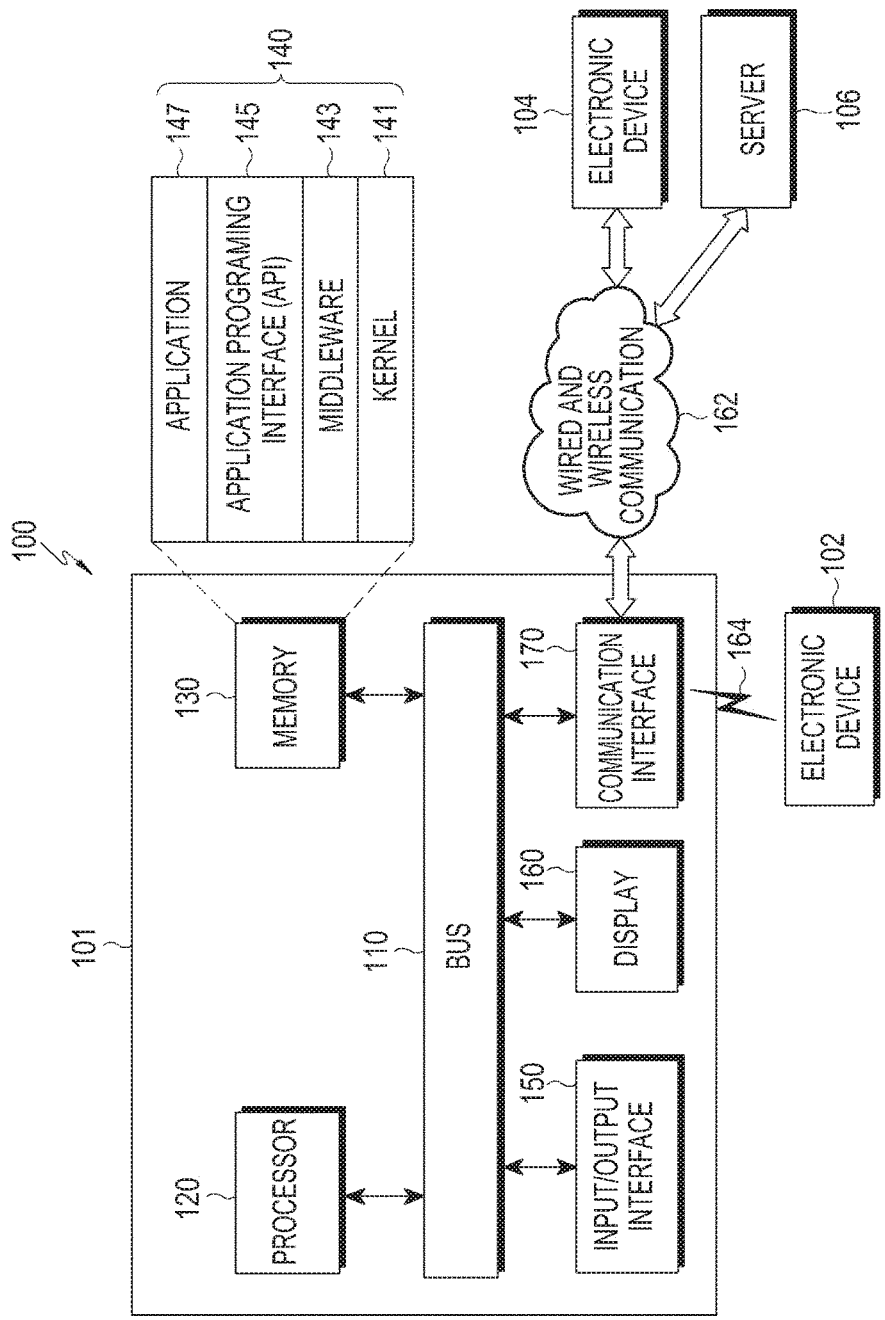
FIG. 1 is a block diagram illustrating an electronic device in a network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there is not an element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a Moving Picture Experts Group phase 1 or phase 2 (MPEG-1 or MPEG-2) audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

According to various embodiments, the electronic device may be a home appliance. The home appliance may include at least one of, for example, a television (TV), a digital video disc (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to various embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to various embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 is a block diagram illustrating an electronic device in a network environment according to various embodiments of the present disclosure.

Referring to FIG. 1, an electronic device 101 within a network environment 100 according to various embodiments is described. The electronic device 101 may include a bus 110, a processor 120, a memory 130, an input/output interface 150, a display 160, and a communication interface 170. In some embodiments, the electronic device 101 may omit at least one of the above components or further include other components.

The bus 110 may include a circuit for connecting the components 110 to 170 and transmitting communication (for example, control messages and/or data) between the components.

The processor 120 may include one or more of a CPU, an AP, and a communication processor (CP). For example, the processor 120 may carry out operations or data processing related to control and/or communication of at least one other element of the electronic device 101.

The memory 130 may include a volatile memory and/or a non-volatile memory. The memory 130 may store, for example, commands or data related to one or more other components of the electronic device 101. According to an embodiment, the memory 130 may store software and/or a program 140. The program 140 may include a kernel 141, middleware 143, an application programming interface (API) 145, and/or an application program (or "application") 147. At least some of the kernel 141, the middleware 143, and the API 145 may be referred to as an operating system (OS).

In the present specification, the application may be referred to as an app or an application.

The kernel 141 may control or manage system resources (for example, the bus 110, the processor 120, or the memory 130) used for executing an operation or function implemented by other programs (for example, the middleware 143, the API 145, or the application 147). In addition, the kernel 141 may access individual components of the electronic device 101 in the middleware 143, the API 145 or the application program 147, and thus may provide an interface capable of controlling or managing the system resources.

The middleware 143 may serve as, for example, an intermediary for allowing the API 145 or the application program 147 to communicate with the kernel 141 to exchange data.

Further, the middleware 143 may process one or more task requests received from the application program 147 according to priorities thereof. For example the middleware 143 may assign a priority of a use of the system resources (e.g., the bus 110, the processor 120, the memory 130, or the like) of the electronic device 101 to at least one program among the application program 147. For example, the middleware 143 may perform scheduling or load balancing on the one or more task requests by processing the one or more task requests according to the priorities assigned to the one or more task requests.

For example, the API 145 may be an interface for enabling the application 147 to control a function provided from the kernel 141 or the middleware 143. In some embodiments, the API 145 may include at least one interface or a function (e.g., a command) for a file control, a window control, an image process, or a text control.

For example, the input/output interface 150 may serve as an interface that may transfer instructions or data input from a user or another external device to other component(s) of the electronic device 101. Further, the input/output interface 150 may output commands or data received from other component(s) of the electronic device 101 to the user or another external device.

In one or more embodiments, the display 160 may include a liquid crystal display (LCD), a light-emitting diode (LED) display, an organic LED (OLED) display, a microelectromechanical systems (MEMS) display, or an electronic paper display. The display 160 may display various types of contents (for example, text, images, videos, icons, or symbols) for users. The display 160 may include a touch screen, and may receive, for example, a touch, gesture, proximity, or hovering input by using an electronic pen or a part of the user's body.

In various embodiments of the present disclosure, the display 160 may be used as having a meaning identical to a touch screen.

For example, the communication interface 170 may set communication between the electronic device 101 and an external device (e.g., a first external electronic device 102, a second external electronic device 104, or a server 106). In some embodiments, the communication interface 170 may be connected to a network 162 through wireless or wired communication to communicate with one or more external devices (e.g., the second external electronic device 104 and/or the server 106).

The wireless communication may use at least one of, for example, long term evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM) as a cellular communication protocol. In addition, for example, the wireless communication may include a short-range communication 164. The short-range communication 164 may include at least one of, for example, Wi-Fi, Bluetooth (BT), near field communication (NFC), and global navigation satellite system (GNSS). The GNSS may include at least one of, for example, a GPS, a global navigation satellite system (Glonass), a Beidou navigation satellite system (hereinafter, referred to as "Beidou"), and Galileo (European global satellite-based navigation system). Hereinafter, in the present specification, the "GPS" may be interchangeably used with the "GNSS". The wired communication may include at least one of, for example, a universal serial bus (USB), a high definition multimedia interface (HDMI), recommended standard 232 (RS-232), and a plain old telephone service (POTS). The network 162 may include at least one of communication networks such as a computer network (for example, a local area network (LAN) or a wide area network (WAN)), the Internet, and a telephone network.

Each of the first and second external electronic devices 102 and 104 may be a device which is the same as or different from the electronic device 101. According to an embodiment, the server 106 may include a group of one or more servers. According to various embodiments, all or some of the operations performed by the electronic device 101 may be performed by another electronic device or a plurality of electronic devices (for example, the electronic device 102 or 104, or server 106). According to an embodiment, when the electronic device 101 should perform some functions or services automatically or by request, the electronic device 101 may make a request to another device (for example, the electronic device 102 or 104, or the server 106) to perform at least a portion of the functions or services instead of performing the functions or services by itself. The other electronic device (for example, the electronic device 102 or 104, or the server 106) may carry out the requested functions or the additional functions and provide results thereof to the electronic device 101. The electronic device 101 may provide requested functions or services based on the received results or after additionally processing the received results. To this end, for example, cloud computing, distributed computing, or client-server computing technology may be used.

Figure 2:
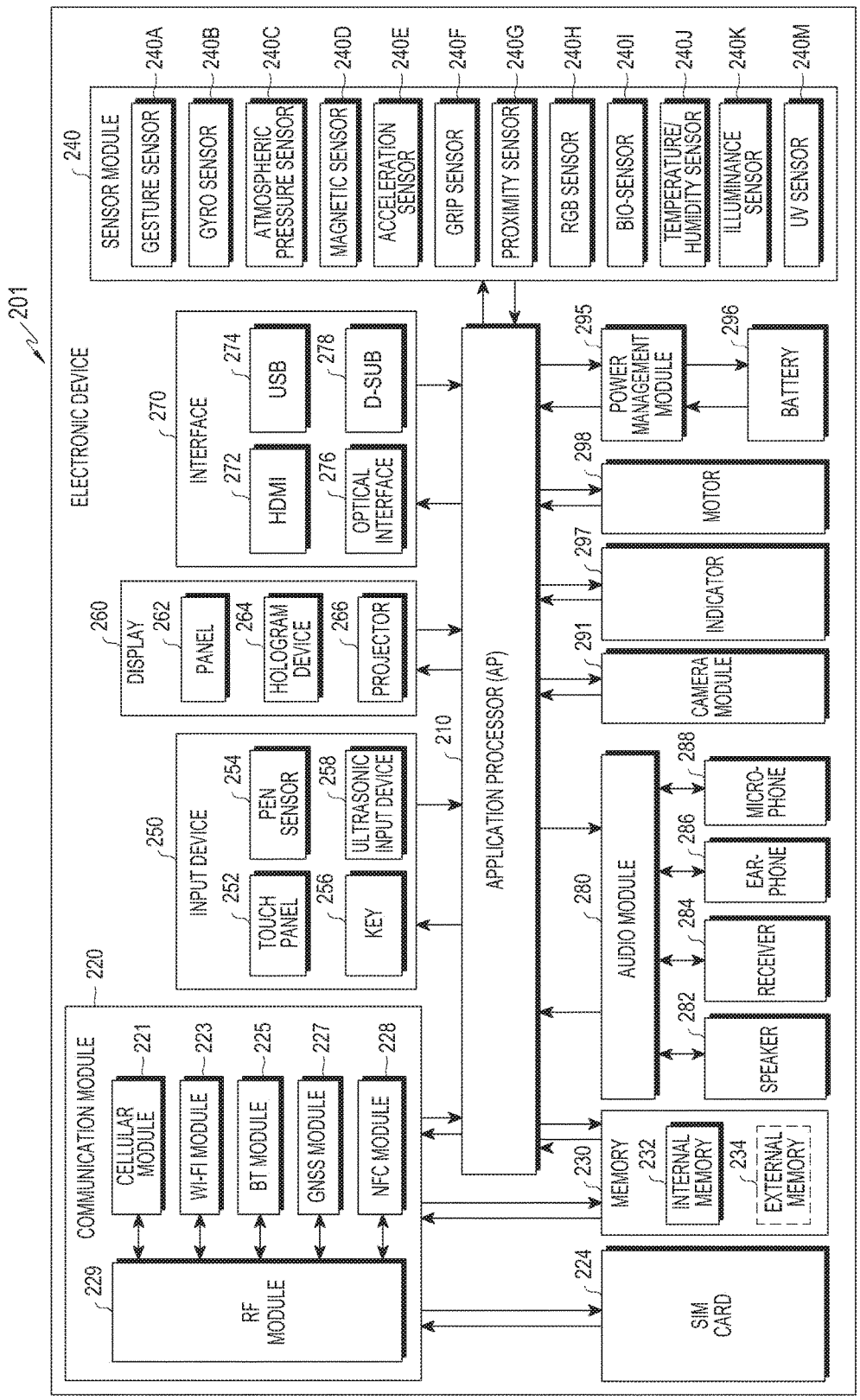
FIG. 2 is a block diagram of an electronic device according to various embodiments of the present disclosure.

FIG. 2 is a block diagram of an electronic device 201 according to various embodiments of the present disclosure.

Referring to FIG. 2, the electronic device 201 may include, for example, all or a part of the electronic device 101 illustrated in FIG. 1. The electronic device 201 may include at least one AP 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an OS or an application program and perform processing of various pieces of data and calculations. The processor 210 may be implemented by, for example, a system on chip (SoC). According to an embodiment, the processor 210 may further include a graphics processing unit (GPU) and/or an image signal processor. The processor 210 may include at least some of the components (for example, a cellular module 221) illustrated in FIG. 2. The processor 210 may load instructions or data received from at least one other component (for example, a non-volatile memory) in a volatile memory, process the loaded instructions or data, and may store various types of data in a non-volatile memory.

The communication module 220 may have a configuration equal or similar to that of the communication interface 170 of FIG. 1. For example, the communication module 220 may include a cellular module 221, a Wi-Fi module 223, a BT module 225, a GNSS module 227 (e.g., a GPS module, a Glonass module, a Beidou module, a Galileo module or the like), an NFC module 228 and a radio frequency (RF) module 229.

The cellular module 221 may provide a voice call, image call, a text message service, or an Internet service through, for example, a communication network. According to an embodiment, the cellular module 221 may distinguish between and authenticate electronic device 201 within a communication network using a SIM (for example, the SIM card 224). According to an embodiment, the cellular module 221 may perform at least some of the functions which can be provided by the processor 210. According to an embodiment, the cellular module 221 may include a CP.

For example, each of the Wi-Fi module 223, the BT module 225, the GNSS module 227, and the NFC module 228 may include a processor for processing data transmitted/received through the corresponding module. According to any embodiment, at least some (two or more) of the cellular module 221, the Wi-Fi module 223, the BT module 225, the GNSS module 227, and the NFC module 228 may be included in one integrated chip (IC) or IC package.

The RF module 229 may transmit/receive, for example, a communication signal (for example, an RF signal). The RF module 229 may include, for example, a transceiver, a power amp module (PAM), a frequency filter, a low noise amplifier (LNA), or an antenna. According to another embodiment, at least one of the cellular module 221, the Wi-Fi module 223, the BT module 225, the GNSS module 227, and the NFC module 228 may transmit/receive an RF signal through a separate RF module.

The SIM card 224 may include, for example, a card including a SIM and/or an embedded SIM, and may further include unique identification information (for example, an integrated circuit card identifier (ICCID)) or subscriber information (for example, international mobile subscriber identity (IMSI)).

The memory 230 (for example, the memory 130) may include, for example, an internal memory 232 or an external memory 234. The internal memory 232 may include at least one of, for example, a volatile memory (for example, a dynamic random access memory (DRAM), a static RAM (SRAM), a synchronous DRAM (SDRAM), and the like) and a non-volatile memory (for example, a one time programmable read only memory (OTPROM), a PROM, an erasable PROM (EPROM), an electrically erasable PROM (EEPROM), a flash memory (for example, a not and (NAND) flash memory or a not or (NOR) flash memory), a hard driver, or a solid state drive (SSD).

The external memory 234 may further include a flash drive, for example, a compact flash (CF), a secure digital (SD), a micro-SD, a mini-SD, an eXtreme digital (xD), a memory stick, or the like. The external memory 234 may be functionally and/or physically to the electronic device 201 through various interfaces.

The sensor module 240 may measure a physical quantity or detect an operation state of the electronic device 201, and may convert the measured or detected information into an electrical signal. For example, the sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red/green/blue (RGB) sensor), a bio-sensor 240I, a temperature/humidity sensor 240J, an illuminance sensor 240K, and an ultra violet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In any embodiment, the electronic device 201 may further include a processor configured to control the sensor module 240 as a part of or separately from the AP 210, and may control the sensor module 240 while the AP 210 is in a sleep state.

The input device 250 may include, for example, a touch panel 252, a (digital) pen sensor 254, a key 256, or an ultrasonic input device 258. The touch panel 252 may use at least one of, for example, a capacitive type, a resistive type, an IR type, and an ultrasonic type. Further, the touch panel 252 may further include a control circuit. The touch panel 252 may further include a tactile layer and provide a tactile reaction to the user.

The (digital) pen sensor 254 may include, for example, a recognition sheet which is a part of the touch panel or separated from the touch panel. The key 256 may include, for example, a physical button, an optical key, or a keypad.

The ultrasonic input device 258 may detect ultrasonic waves generated by an input tool through a microphone (for example, a microphone 288) and may identify data corresponding to the detected ultrasonic waves.

The display 260 (for example, the display 160) may include a panel 262, a hologram device 264, or a projector 266. The panel 262 may include the same or a similar configuration to the display 160 illustrated in FIG. 1. The panel 262 may be implemented to be, for example, flexible, transparent, or wearable. The panel 262 may be formed to be a single module with the touch panel 252. The hologram 264 may show a three dimensional image in the air by using an interference of light. The projector 266 may display an image by projecting light onto a screen. The screen may be located, for example, inside or outside the electronic device 201. According to an embodiment, the display 260 may further include a control circuit for controlling the panel 262, the hologram device 264, or the projector 266.

In various embodiments of the present disclosure, the display 160 including the panel 262 may be used as having a meaning identical to or similar to the touch screen. That is, the touch screen may be defined as having a meaning which includes the display 160 displaying specific information and the panel 262 capable of receiving a touch input.

The interface 270 may include, for example, a HDMI 272, a USB 274, an optical interface 276, or a D-subminiature (D-sub) 278. The interface 270 may be the communication module illustrated in FIG. 1. Additionally or alternatively, the interface 270 may include, for example, a mobile high-definition Link (MHL) interface, an SD card/multi-media card (MMC) interface, or an Infrared Data Association (IrDA) standard interface.

The audio module 280 may bilaterally convert, for example, a sound and an electrical signal. At least some components of the audio module 280 may be included in, for example, the input/output interface 150 shown in FIG. 1. The audio module 280 may process sound information which is input or output through, for example, a speaker 282, a receiver 284, earphones 286, the microphone 288, or the like.

The camera module 291 is a device which may photograph a still image and a dynamic image. According to an embodiment, the camera module 291 may include one or more image sensors (for example, a front sensor or a back sensor), a lens, an image signal processor (ISP) or a flash (for example, LED or xenon lamp).

The power management module 295 may manage, for example, power of the electronic device 201. According to an embodiment, the power management module 295 may include a power management integrated circuit (PMIC), a charger IC, or a battery or fuel gauge. The PMIC may have a wired and/or wireless charging scheme. A magnetic resonance scheme, a magnetic induction scheme, or an electromagnetic scheme may be used as the wireless charging method, and an additional circuit for wireless charging, such as a coil loop circuit, a resonance circuit, a rectifier circuit, and the like may be added. The battery gauge may measure, for example, a residual quantity of the battery 296, and a voltage, a current, or a temperature during the charging. The battery 296 may include, for example, a rechargeable battery or a solar battery.

The indicator 297 may display a predetermined state of the electronic device 201 or a part of the electronic device 201 (for example, the processor 210), such as a boot-up state, a message state, a charging state, or the like. The motor 298 may convert an electrical signal into mechanical vibrations, and may generate a vibration or haptic effect.

Although not illustrated, the electronic device 201 may include a processing unit (for example, a GPU) for supporting mobile TV. The processing unit for supporting mobile TV may, for example, process media data according to a certain standard such as digital multimedia broadcasting (DMB), digital video broadcasting (DVB), or mediaFLO™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
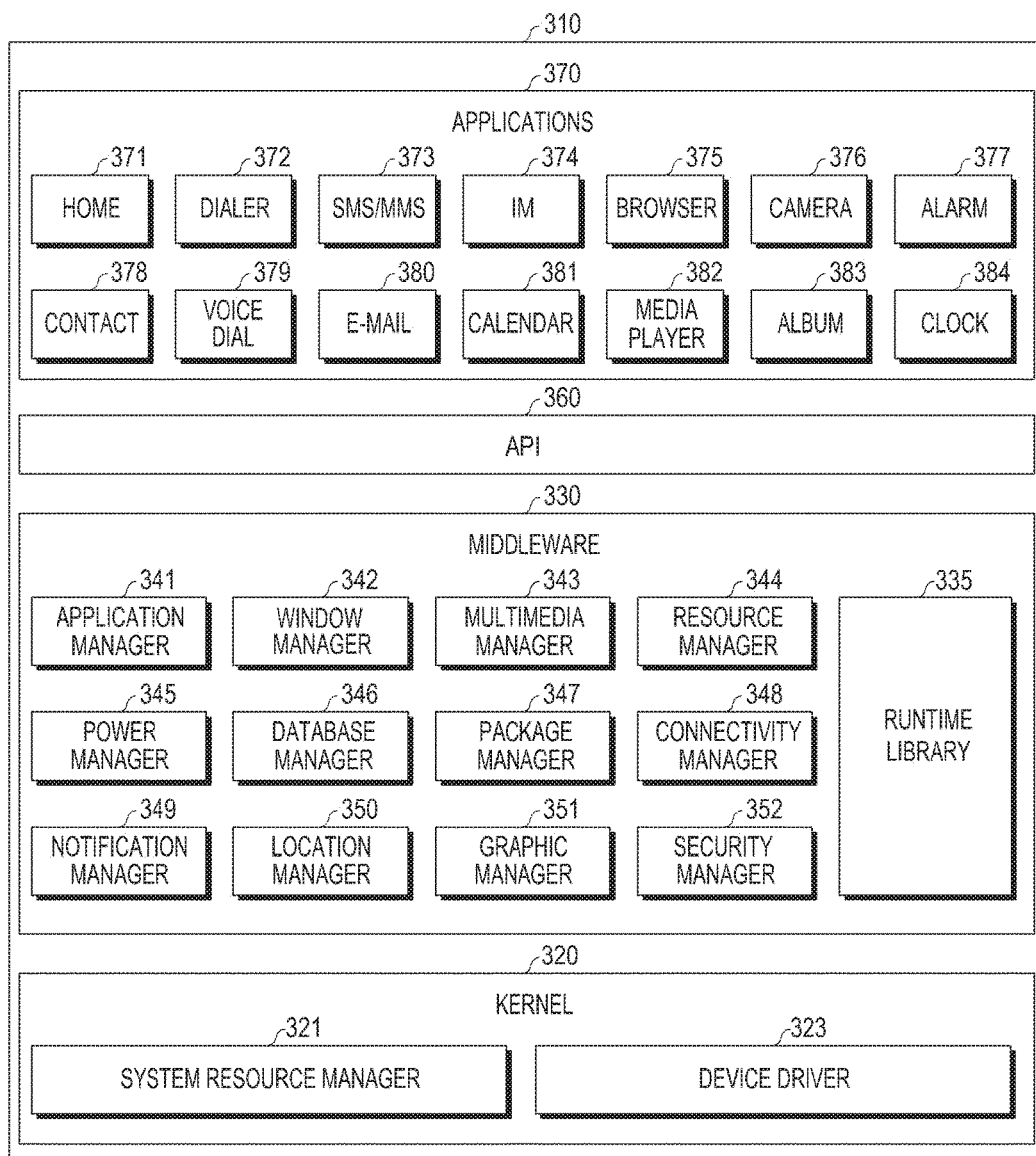
FIG. 3 is a block diagram of a program module according to various embodiments of the present disclosure.

FIG. 3 is a block diagram of a program module according to various embodiments of the present disclosure.

Referring to FIG. 3, the program module 310 (for example, the program 140) may include an OS for controlling resources related to the electronic device (for example, the electronic device 101) and/or various applications (for example, the application program 147) executed in the OS. The OS may be, for example, Android, iOS, Windows, Symbian, Tizen, Bada, or the like.

The programming module 310 may include a kernel 320, middleware 330, an API 360, and/or applications 370. At least some of the program module 310 may be preloaded on the electronic device or may be downloaded from an external electronic device (e.g., the electronic device 102 or 104, the server 106 or the like).

The kernel 320 (e.g., the kernel 141) may include, for example, a system resource manager 321 and/or a device driver 323. The system resource manager 321 may control, allocate, or collect the system resources. According to an embodiment, the system resource manager 321 may include a process manager, a memory manager, or a file system manager. The device driver 323 may include, for example, a display driver, a camera driver, a BT driver, a shared-memory driver, a USB driver, a keypad driver, a Wi-Fi driver, an audio driver, or an inter-process communication (IPC) driver.

The middleware 330 may provide a function used by the applications 370 in common or provide various functions to the applications 370 through the API 360 so that the applications 370 can efficiently use limited system resources within the electronic device. According to an embodiment, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses to add new functions through a programming language while an application of the applications 370 is executed. The runtime library 335 may perform input/output management, memory management, or a function for an arithmetic function.

The application manager 341 may manage, for example, a life cycle of at least one of the applications 370. The window manager 342 can manage graphical user interface (GUI) resources used by a screen. The multimedia manager 343 may grasp formats used for the reproduction of various media files, and may perform an encoding or decoding of the media file by using a codec suitable for the corresponding format. The resource manager 344 may manage resources such as a source code, a memory, and a storage space of at least one of the applications 370.

The power manager 345 may operate together with a basic input/output system (BIOS) to manage a battery or power and may provide power information used for the operation of the electronic device. The database manager 346 may generate, search for, or change a database to be used by at least one of the applications 370. The package manager 347 may manage the installation or the updating of applications distributed in the form of package file.

The connectivity manager 348 may manage wireless connection of, for example, Wi-Fi or BT. The notification manager 349 can display or notify of an event such as an arrival message, promise, proximity notification, and the like in such a way that does not disturb a user. The location manager 350 may manage location information of the electronic device. The graphic manager 351 may manage graphic effects to be provided to a user and user interfaces related to the graphic effects. The security manager 352 may provide all security functions used for system security or user authentication. According to an embodiment, when the electronic device (for example, electronic device 101) has a call function, the middleware 330 may further include a telephony manager for managing a voice call function or a video call function of the electronic device.

The middleware 330 may include a middleware module for forming a combination of various functions of the aforementioned components. The middleware 330 may provide modules specialized according to types of OSs in order to provide differentiated functions. Further, the middleware 330 may dynamically remove some of the existing components or add new components.

The API 360 (e.g., the API 145) is, for example, a set of API programming functions, and a different configuration thereof may be provided according to an OS. For example, with respect to each platform, one API set may be provided in a case of Android or iOS, and two or more API sets may be provided in a case of Tizen.

The applications 370 (for example, the application program 147) may include, for example, one or more applications which can provide functions such as home 371, dialer 372, short message service (SMS)/multimedia message service (MMS) 373, instant message (IM) 374, browser 375, camera 376, alarm 377, contacts 378, voice dialer 379, email 380, calendar 381, media player 382, album 383, clock 384, health care (for example, measure exercise quantity or blood sugar), or environmental information (for example, atmospheric pressure, humidity, or temperature information).

According to an embodiment, the applications 370 may include an application (hereinafter, referred to as an information exchange application for convenience of description) which supports an information exchange between the electronic device (e.g., the electronic device 101) and the external electronic device (e.g., the electronic device 102 or 104). The information exchange application may include, for example, a notification relay application for notifying an external electronic device of certain information or a device management application for managing an external electronic device.

For example, the notification relay application may include a function of transferring, to the external electronic device (for example, the electronic device 102 or 104), notification information generated from other applications of the electronic device 101 (for example, an SMS/MMS application, an e-mail application, a health management application, or an environmental information application). Further, the notification relay application may receive notification information from, for example, the external electronic device and may provide the received notification information to the user.

The device management application may manage (for example, install, delete, or update), for example, a function for at least a part of the external electronic device (for example, the electronic device 102 or 104). The managed function may include communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service).

According to an embodiment, the applications 370 may include applications (for example, a health care application of a mobile medical appliance or the like) designated according to attributes of the external electronic device 102 or 104. According to an embodiment, the applications 370 may include an application received from the external electronic device (for example, the server 106, or the electronic device 102 or 104). According to an embodiment, the applications 370 may include a preloaded application or a third party application which can be downloaded from the server. Names of the components of the program module 310 according to the above described embodiments may vary depending on the type of OS.

According to various embodiments, at least some of the programming module 310 may be implemented in software, firmware, hardware, or a combination of two or more thereof. At least a portion of the programming module 310 may, for example, be implemented (e.g., executed) by a processor (e.g., the AP 210). At least some of the programming module 310 may include, for example, a module, program, routine, sets of instructions, or process for performing one or more functions.

Figure 4:
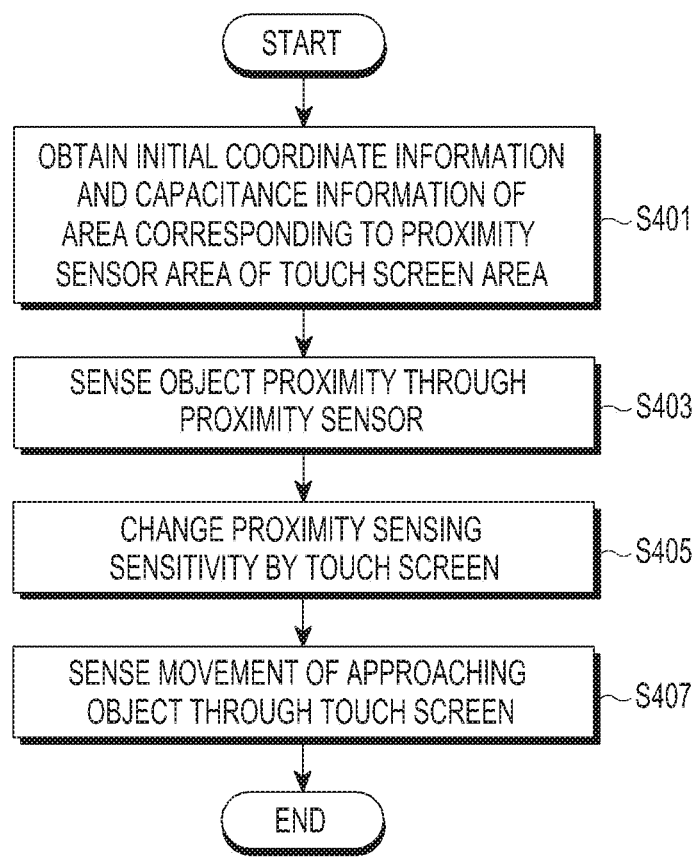
FIG. 4 is a flowchart illustrating a method of sensing an object according to various embodiments of the present disclosure.

FIG. 4 is a flowchart illustrating a method of sensing an object according to various embodiments of the present disclosure.

Referring to FIG. 4, an electronic device according to various embodiments of the present disclosure obtains initial coordinate information and capacitance information of an area (or overlap area) corresponding to a proximity sensor area in an area of a touch screen at operation S401.

More specifically, the electronic device may store coordinate information (or initial coordinate information) for the overlap area within the touch screen. In another embodiment, the electronic device may store information on the overlap area beforehand.

In addition, the electronic device according to various embodiments may include a capacitive touch screen and a capacitive proximity sensor, and may obtain and store initial capacitance information of the capacitive touch screen and the capacitive proximity sensor before an object approaches. Additionally, when information on the overlap area is stored beforehand as described above, the initial capacitance information may be also stored beforehand.

According to various embodiments, when the initial coordinate information and the initial capacitance information are obtained, the electronic device senses a proximity of the object over the touch screen using the proximity sensor at operation S403. The proximity sensor may detect the object within a first distance from the electronic device. A driving current of a first size may be applied to the proximity sensor, and a capacitance sensing field, for example, an electric field, may be formed based on the applied driving current. Here, the first distance in which the proximity sensor may detect the object may be comparatively longer than of a second distance in which the touch screen may detect the object. A current of a size lower than the first size may be applied to each touch sensor of the touch screen, and thus a size of a capacitance sensing field formed by the touch screen may be smaller than a capacitance sensing field formed by the proximity sensor.

According to various embodiments, the proximity sensor may be disposed under the touch screen or at an edge of the touch screen, and may form the capacitance sensing field where a change of a capacitance may be sensed. The proximity sensor may form the capacitance sensing field on the touch screen. But, the above descriptions are simply examples, and a position of the proximity sensor is not limited. When the object approaches an area within a proximity sensor sensing distance from the proximity area (e.g., among an upper area of the touch screen), the electronic device may sense the change of the capacitance according to a change of the capacitance sensing field formed by the proximity sensor. When the change of the capacitance is sensed, the electronic device may determine that the object approaches the area of the touch screen correspondingly to the change of the capacitance (e.g., the upper area). Meanwhile, when the object is disposed in an area equal to or longer than the second distance and shorter than the first distance, the proximity sensor may detect the object and the touch screen may not detect the object.

According to various embodiments, when the proximity of the object is sensed, the electronic device changes a proximity sensing sensitivity by the touch screen at operation S405.

More specifically, the electronic device may change a sensitivity of the touch screen and may sense a position of the approached object using the touch screen. More specifically, the electronic device may increase a distance from the touch screen at which a position of the object can be sensed. In an embodiment, the electronic device may increase a size of the driving current applied to each touch sensor of the touch screen. According to the increase of the driving current, a size of an electric field formed by a touch sensor may be increased, and thus a distance at which the touch screen can sense an object may also be increased.

According to various embodiments, when the proximity sense sensitivity of the touch screen is changed, the electronic device senses a movement of the object through the touch screen at operation S407. As described above, according to the increase of the distance at which the touch screen can sense the object, the touch screen may additionally detect the position and the movement of the object while detecting the object.

More specifically, the electronic device according to various embodiments may obtain position information of the approached object using the touch screen of which the sense-able distance is increased to the position of the object. More specifically, the electronic device may sense the change of the capacitance according to the change of the capacitance field formed by the touch screen, and may sense at least one of the position of the object or the movement of the object correspondingly to the change of the capacitance.

According to various embodiments, the position information of the approached object may include the coordinate information obtained by the electronic device using the touch screen, and coordinates may be a horizontal coordinate obtained using the touch screen.

When the position information of the object is obtained, the electronic device may obtain the change of the position of the approached object, may sense the movement of the approached object based on the change of the obtained position, and may recognize a gesture corresponding to the movement of the sensed object.

Figure 5A:
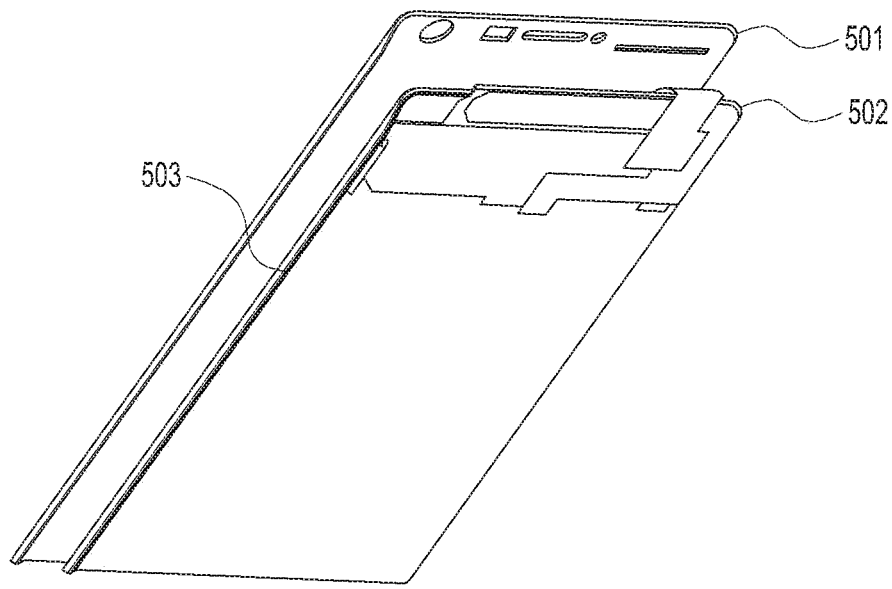
FIGS. 5A and 5B are views illustrating an example of an electronic device according to various embodiments of the present disclosure.
Figure 5B:
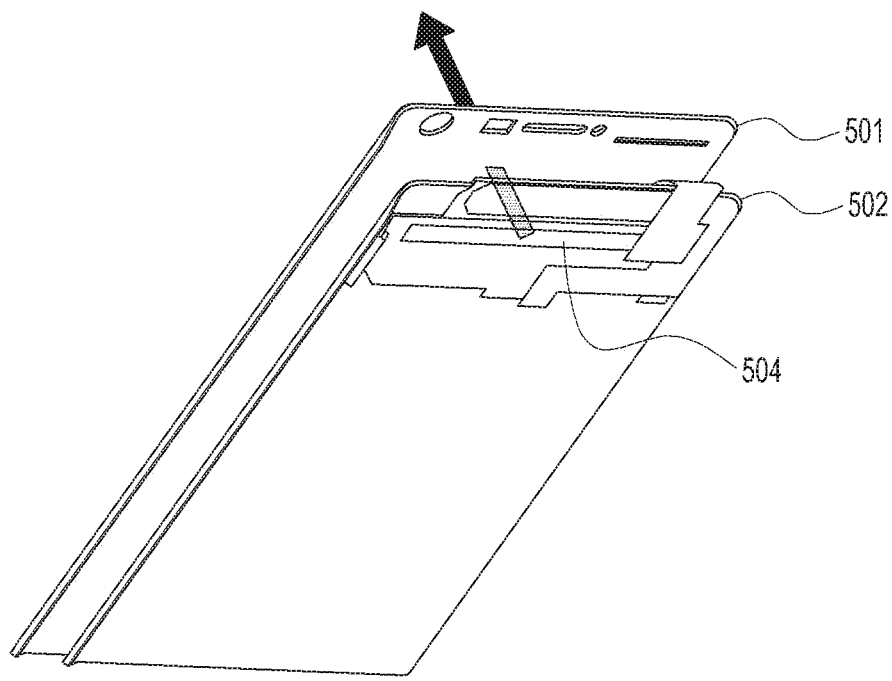

FIGS. 5A and 5B are views illustrating an example of an electronic device according to various embodiments of the present disclosure.

Referring to FIGS. 5A and 5B, the electronic device according to various embodiments may include a housing 501 and a flexible printed circuit board (FPCB) panel 502.

The housing 501 may include a first surface and a second surface (not shown) opposite to the first surface.

The FPCB panel 502 may be disposed between the first surface and the second surface of the housing 501. The FPCB panel 502 may include a touch screen (i.e., a touch sensor and a display). In addition, the FPCB panel 502 may include a proximity sensor 504 disposed at a lower portion 503 of the touch screen or at an edge illustrated in FIG. 5B of the touch screen.

The proximity sensor may be a plate type. The proximity sensor of the plate type may be formed of copper. In the proximity sensor having the plate type and including copper, the larger an area of the plate, the larger a critical value of a capacitance which may be sensed by the proximity sensor and the longer a sense distance for maintaining the same capacitance.

Figure 6A:
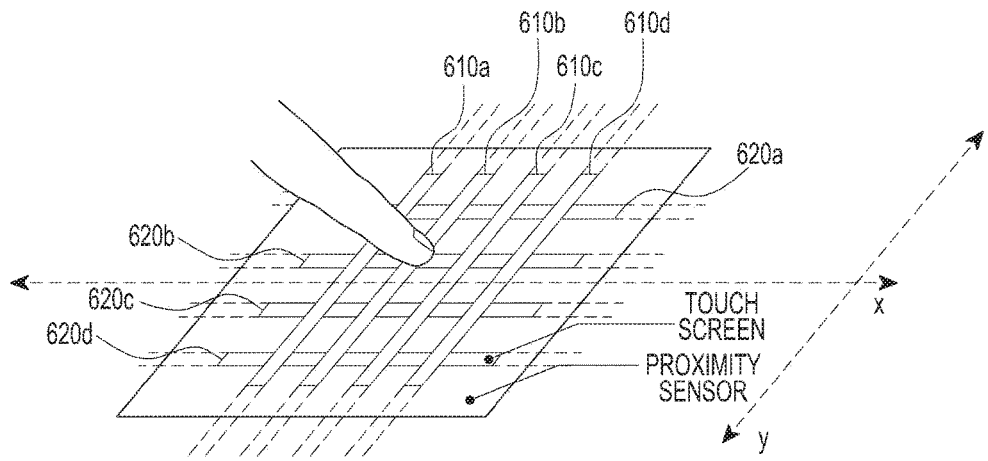
FIG. 6A is a plan view of a touch screen and a proximity sensor according to various embodiments of the present disclosure.

FIG. 6A is a plan view of a touch screen and a proximity sensor according to various embodiments of the present disclosure.

Referring to FIG. 6A, the touch screen may include a plurality of touch sensors 610a, 610b, 610c, 610d, 620a, 620b, 620c and 620d (i.e., indium tin oxide (ITO) layers) of a lattice type.

The plurality of touch sensors may include a plurality of conductive line sensors 610a, 610b, 610c and 610d and a plurality of sense line sensors 620a, 620b, 620c and 620d. The electronic device may apply a predetermined value of current through the plurality of conductive line sensors 610a, 610b, 610c and 610d, and may form a capacitance sense field in a sense-able area in an area over the touch screen through the plurality of sense line sensors 620a, 620b, 620c and 620d based on the applied current. The electronic device according to various embodiments of the present disclosure may sense a change of a capacitance by an approach of an object to the sense-able area using the touch screen, and may obtain position information on an x,y coordinates plane for the approached object based on the sensed change of the capacitance.

Meanwhile, according to various embodiments, the proximity sensor may overlap at least a portion of the touch screen corresponding to touch sensors 610a, 610b, 610c, 610d, 620a, 620b, 620c and/or 620d. The electronic device may store the initial coordinate information for some of the overlap area of the touch screen overlapping the proximity sensor on the x,y coordinates plane in a memory (not shown) beforehand. The electronic device may change a proximity sensitivity of the overlap area of the touch screen based on the initial coordinate information stored beforehand when the object approaches the electronic device. More specifically, the electronic device may increase a size of a current applied to the plurality of conductive line sensors 610a, 610b, 610c and 610d. According to the increase of the size of the current applied to the plurality of conductive line sensors 610a, 610b, 610c and 610d, a size of the capacitance sense field and the sense-able distance may also be increased. Therefore, the electronic device may detect an object disposed at a comparatively far distance based on a signal from the touch screen, and may detect at least one of the position and the movement of the object.

Figure 6B:
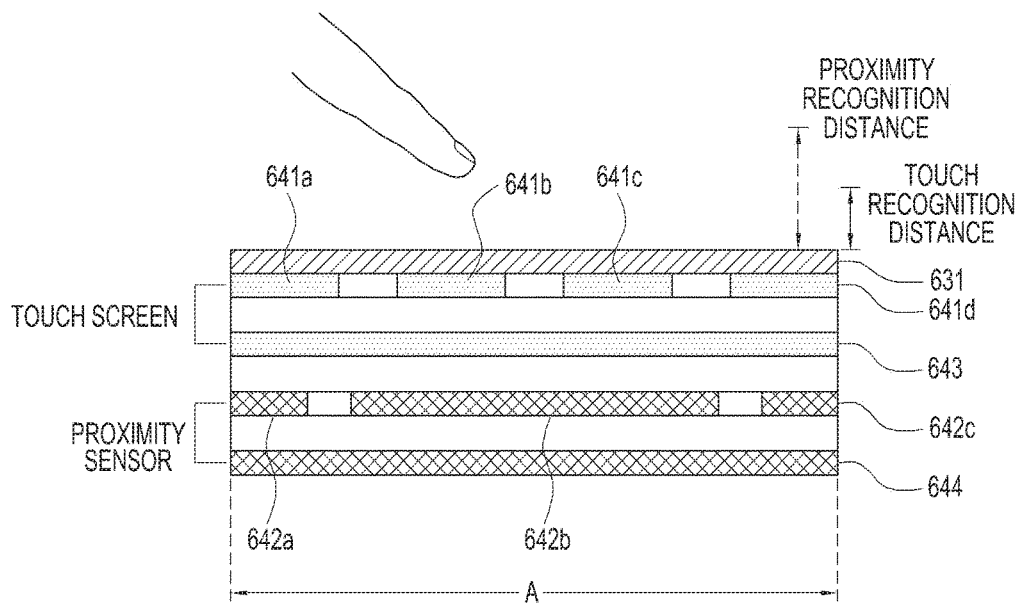
FIG. 6B is a cross-sectional view of a touch screen and a proximity sensor according to various embodiments of the present disclosure.

FIG. 6B is a cross-sectional view of a touch screen and a proximity sensor according to various embodiments of the present disclosure.

Referring to FIG. 6B, an electronic device according to various embodiments may include a sensor 631, a touch screen having touch sensors 641a, 641b, 641c, 641d and 643 and proximity sensors 642a, 642b, 642c and 644.

The touch screen may include a plurality of touch sensors 641a, 641b, 641c, 641d and 643 of a laminated plate type. The proximity sensor may also include a plurality of proximity sensors 642a, 642b, 642c and 644 of a laminated plate type.

Each of the plurality of touch sensors 641a, 641b, 641c, 641d and 643 and each of the proximity sensors 642a, 642b, 642c and 644 may be a conductor forming a capacitor.

According to various embodiments, first touch sensors 641a, 641b, 641c and 641d, a second touch sensor 643, first proximity sensors 642a, 642b and 642c and a second proximity sensor 644 may be electrically connected with each other in series. Since each of the sensors is connected with each other in series, capacitors formed by each of the sensors may be connected in series. Therefore, a sum of capacitances of the plurality of sensors having the plate type is in reverse proportion to the number of the sensors, and thus the sum of capacitances of the plurality of sensors having the plate type is lower than a capacitance of each sensor. Accordingly, the sense-able distance from the touch screen to the object, which may be sensed through the plurality of sensors is increased in proportion to the number of the sensors.

According to various embodiments, each of the plurality of sensors may be electrically connected to a processor (not shown) of the electronic device. The processor may sense the change of the capacitance through each sensor, and may sense the proximity of the object and the position of the approached object using the sensed the change of the capacitance.

According to various embodiments, each sensor may be arranged as a plurality of plates type in order to reduce a parasitic capacitance by each sensor 631, 641, 642, 643 and 644 to a value lower than a predetermined value such that the processor may normally sense the capacitance change. In an embodiment, a structure for shielding may be further disposed between the plurality of plates, and thus the parasitic capacitance may be reduced. The parasitic capacitance due to the sensors 631, 641, 642, 643 and 644 is inversely proportional to an area A of the plate of each sensor.

According to various embodiments, the plurality of touch sensors 641a, 641b, 641c, 641d and 643 may be connected to a first electrode and a second electrode (not shown). The first electrode or the second electrode may include ITO or a silver nano wire (i.e., $A_g$ nano wire). The processor may apply the current to the plurality of touch sensors 641a, 641b, 641c, 641d and 643 through the first electrode and the second electrode.

According to various embodiments, the plurality of proximity sensors 642a, 642b, 642c and 644 may be connected to a third electrode and a fourth electrode (not shown) having a resistance lower than that of the first electrode and the second electrode. According to various embodiments, the third electrode or the fourth electrode may include copper. According to various embodiments, the third electrode or the fourth electrode may be disposed on an FPCB in which a touch panel is included. According to various embodiments, the third electrode or the fourth electrode may be formed on a shield layer (not shown) for shielding an electric field (e.g., an electric field formed by a capacitance) related to a display.

The position of the proximity sensor may be changed in the electronic device according to an embodiment.

Each proximity sensor may have an area equal to or larger than an area corresponding to a critical value of a capacitance value which may be sensed by the processor.

Figure 7:
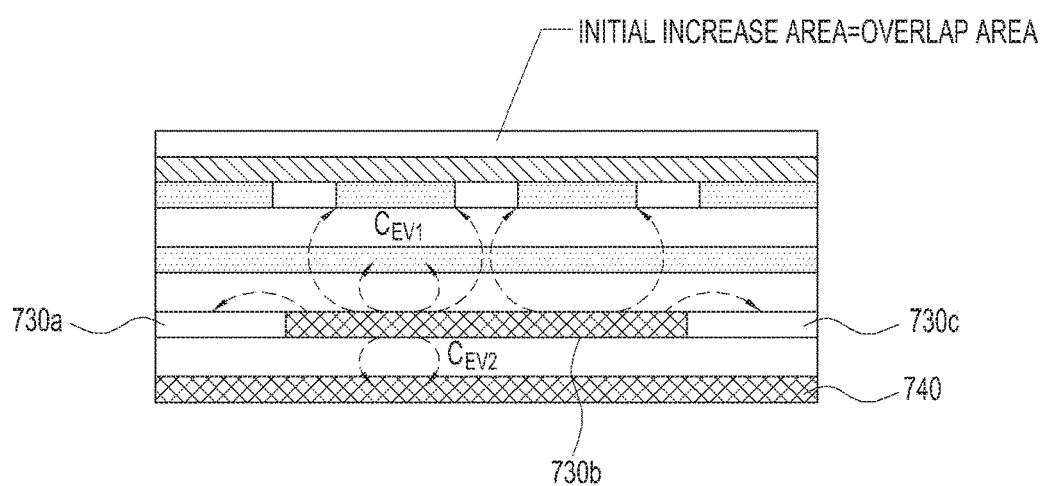
FIG. 7 is a cross-sectional view illustrating a touch screen and a proximity sensor obtaining information on an overlap area according to various embodiments of the present disclosure.

FIG. 7 is a cross-sectional view illustrating a touch screen and a proximity sensor obtaining information on an overlap area according to various embodiments of the present disclosure.

Referring to FIG. 7, according to various embodiments, an electronic device may obtain information on a first initial capacitance $C_{EV1}$ sensed in an upper area of the touch screen, among the first initial capacitance $C_{EV1}$ and a second initial capacitance $C_{EV2}$ increased by a plurality of proximity sensors 730a, 730b, 730c and 740 before an object approaches the electronic device, and may store the obtained information on the first initial capacitance $C_{EV1}$ in a memory (not shown).

In addition, the electronic device may define an area where the first initial capacitance $C_{EV1}$ is sensed in an area of the touch screen as an initial increase area (or an overlap area), may obtain coordinate information for a corresponding initial increase area (or the overlap area) from the touch screen, and may store the coordinate information in the memory. Here, the initial increase area may mean an area where a capacitance is increased by the proximity sensor, and may be referred to as the overlap area.

Figure 8:
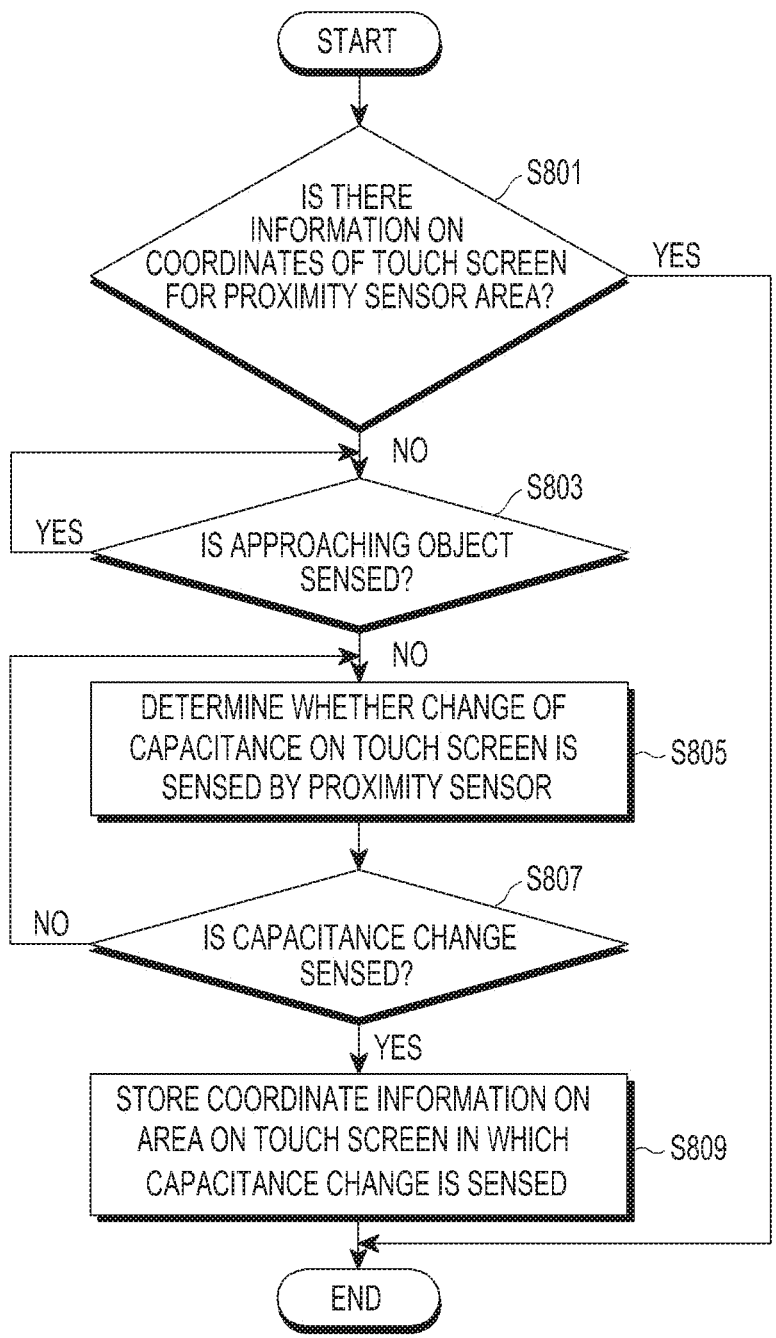
FIG. 8 is flowchart illustrating a method of obtaining information on an overlap area according to various embodiments of the present disclosure.

FIG. 8 is flowchart illustrating a method of obtaining information on an overlap area according to various embodiments of the present disclosure.

Referring to FIG. 8, according to various embodiments, a processor of an electronic device determines whether there is coordinate information on a proximity sensor area (i.e., the overlap area) overlapping the proximity sensor area in an area of a touch screen in the electronic device at operation S801.

When it is determined that there is no coordinate information on the overlap area, the processor determines whether an object approached an upper area of the electronic device (i.e., the touch screen) is sensed at operation S803.

When the approached object is sensed, the processor determines a sense of the approached object until the approached object moves far away from the electronic device and thus a proximity of the object is not sensed.

When it is determined that the approached object is not sensed, the processor determines whether a change of a capacitance is sensed by a proximity sensor using the touch screen at operation S805.

As a result of the determination, when the change of the capacitance by the proximity sensor is sensed through the touch screen at operation S807, the processor stores coordinate information on an area on the touch screen where the change of the capacitance is sensed in a memory at operation S809.

Figure 9A:
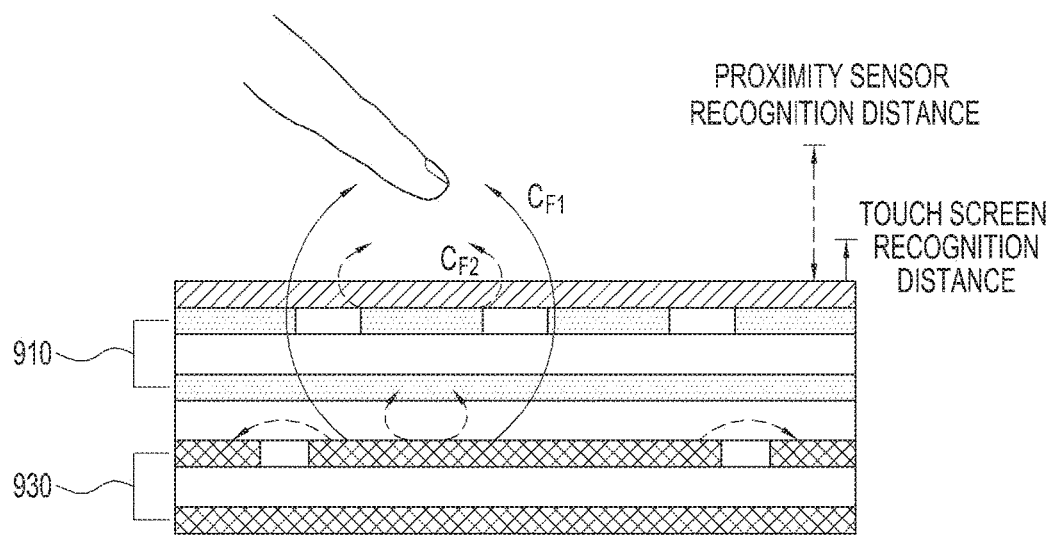
FIGS. 9A and 9B are cross-sectional views illustrating an example of a touch screen and a proximity sensor sensing an object according to various embodiments of the present disclosure.
Figure 9B:
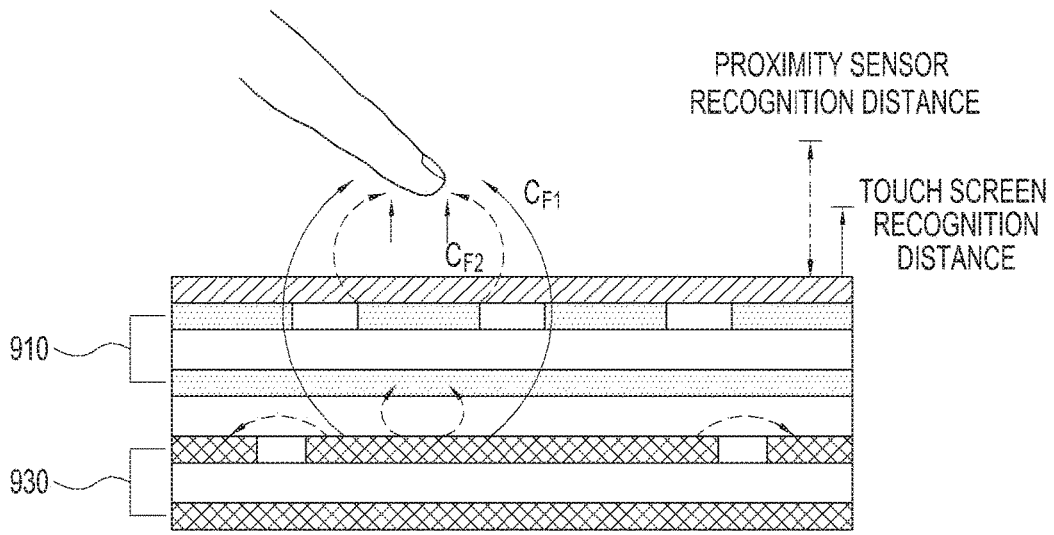

FIGS. 9A and 9B are cross-sectional views illustrating an example of a touch screen and a proximity sensor sensing an object according to various embodiments of the present disclosure.

Referring to FIG. 9A, according to various embodiments, a processor (not shown) may sense a proximity of the object using a proximity sensor 930. More specifically, the processor may sense a change of a first capacitance $C_{F1}$ by the object approached an area within a proximity sensor recognition distance. When the change of the first capacitance $C_{F1}$ through the proximity sensor 930 is sensed, the processor may sense the proximity of the object.

Referring to FIG. 9B, according to various embodiments, when the proximity of the object is sensed, the processor may change a proximity sensitivity for an overlap area of a touch screen 910. More specifically, the processor may increase a sense-able distance from a predetermined distance to a distance from the touch screen 910 to the object. More specifically, the processor may expand a capacitance sense field formed by the touch screen 910 up to a position of the approached object.

According to various embodiments, when the proximity sensitivity of the touch screen 910 is changed, the processor may sense position information of the approached object using the touch screen 910 of which the proximity sensitivity is changed. More specifically, the processor may sense a change of a second capacitance $C_{F2}$ by the object moved to an area within a touch screen recognition distance. When the change of the second capacitance $C_{F2}$ is sensed through the touch screen 910, the processor may sense the position information of the object and the movement of the object according to a position change, based on the change of the second capacitance $C_{F2}$.

Figure 10:
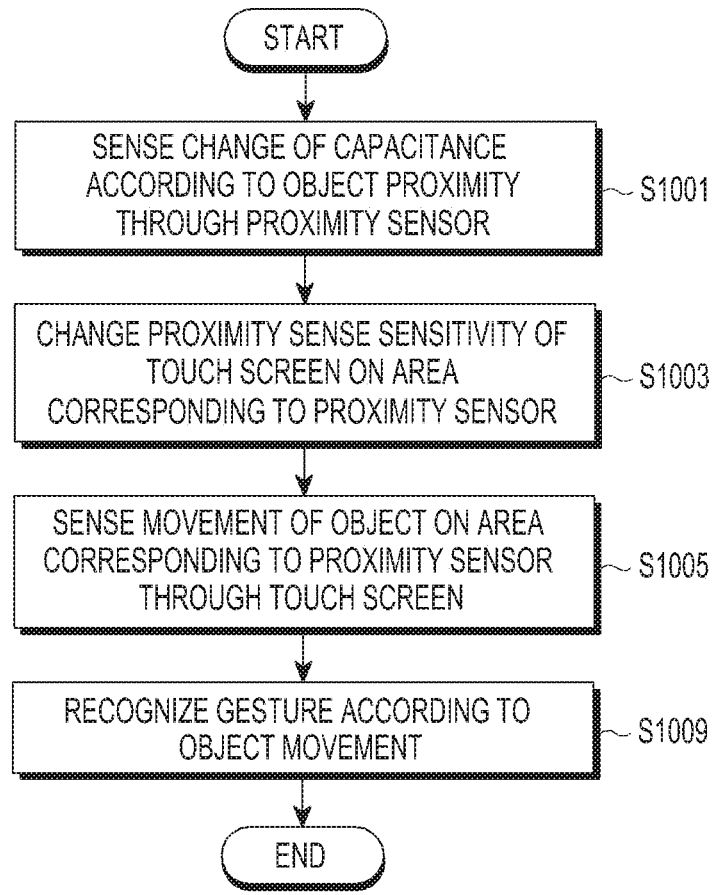
FIG. 10 is a flowchart illustrating an example of a method of sensing an object according to various embodiments of the present disclosure.

FIG. 10 is a flowchart illustrating an example of a method of sensing an object according to various embodiments of the present disclosure.

Referring to FIG. 10, according to various embodiments, a processor senses a change of a capacitance according to a proximity of the object through a proximity sensor at operation S1001.

When the change of the capacitance through the proximity sensor is sensed, the processor changes a proximity sense sensitivity of a touch screen on an area corresponding to the proximity sensor at operation S1003.

When the proximity sense sensitivity of the touch screen is changed, the processor senses a movement of the object on the area corresponding to the proximity sensor using the touch screen at operation S1005.

When the movement of the object is sensed, the processor recognizes a gesture according to the movement of the object at operation S1009.

Figure 11:
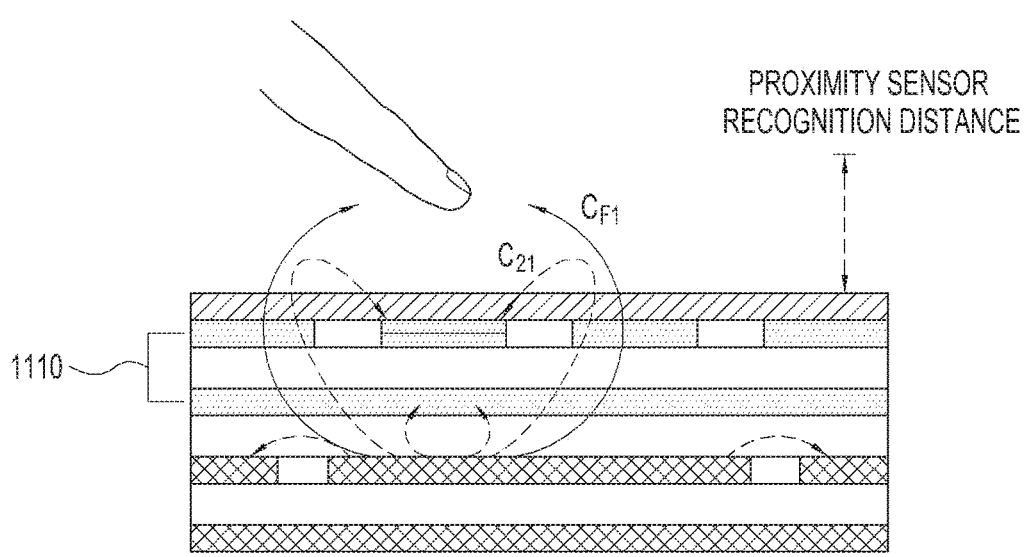
FIG. 11 is cross-sectional view illustrating a touch screen and a proximity sensor sensing an object according to various embodiments of the present disclosure.

FIG. 11 is cross-sectional view illustrating a touch screen and a proximity sensor sensing an object according to various embodiments of the present disclosure.

Referring to FIG. 11, according to various embodiments, a processor may sense a change of a capacitance $C_{F1}$ according to a proximity of an object which approaches an area within a recognition distance of a proximity sensor, using the proximity sensor.

When the change of the capacitance $C_{F1}$ according to the proximity of the object is sensed, the processor may change a proximity sense sensitivity for an overlap area of a touch screen 1110.

When the proximity sense sensitivity of the touch screen is changed, the processor may sense a change between an initial capacitance of the overlap area stored previously before the object approaches the touch screen 1110 and a current capacitance $C_{21}$ obtained using the touch screen 1110 according to the proximity of the object. The current capacitance $C_{21}$ may be larger than the initial capacitance. An electronic device may determine a position of the object or movement information of the object based on a signal from a touch screen area in which the current capacitance $C_{21}$ is increased.

The touch screen may sense the movement of the object according to a result of a comparison of the change of the capacitance by the touch screen 1110, and may recognize a gesture based on the sensed movement of the object.

Figure 12:
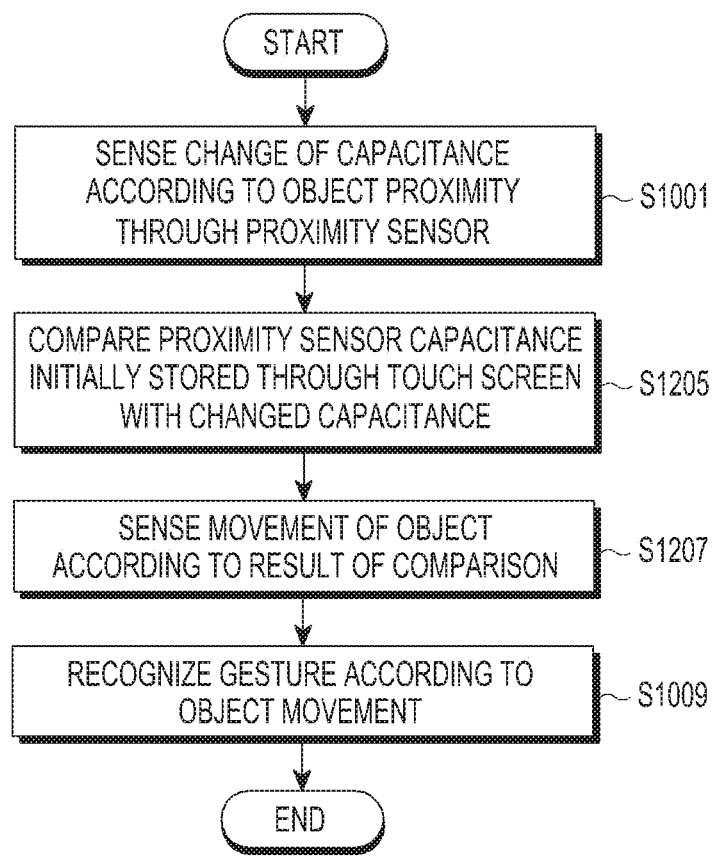
FIG. 12 is a flowchart illustrating a method of sensing an object according to various embodiments of the present disclosure.

FIG. 12 is a flowchart illustrating another method of sensing an object according to various embodiments of the present disclosure.

Referring to FIG. 12, a processor senses a change of a capacitance according to a proximity of an object through a proximity sensor at operation S1001. When the change of the capacitance according to the proximity of the object is sensed, the processor may change a proximity sensitivity for an overlap area of a touch screen.

According to various embodiments, when the proximity sensitivity of the touch screen is changed, the processor compares a current capacitance sensed using the touch screen in which the proximity sensitivity is changed with a previously stored initial capacitance at operation S1205.

The processor senses a movement of the object according to a result of the comparison of the initial capacitance and the current capacitance sensed using the touch screen at operation S1207.

When the movement of the object is sensed, the processor recognizes a gesture according to the movement of the object at operation S1009.

Figure 13:
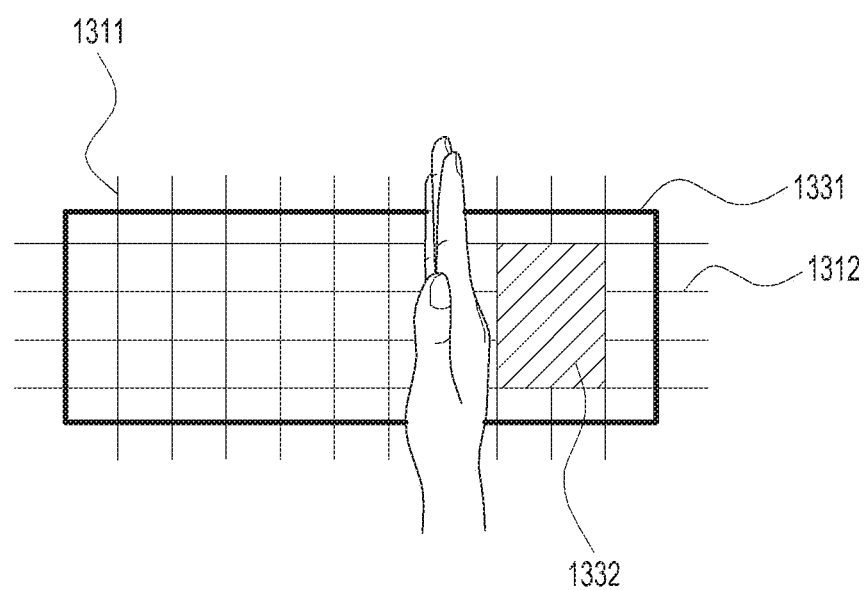
FIG. 13 is a plan view illustrating a touch screen sensing a position of an object according to various embodiments of the present disclosure.

FIG. 13 is a plan view illustrating a touch screen sensing a position of an object according to various embodiments of the present disclosure.

Referring to FIG. 13, according to various embodiments, an electronic device (or a processor) may sense position information 1332 of an object (e.g., a hand) sensed using a proximity sensor (not shown), using an overlap area 1331 of a touch screen sensors 1311 and 1312 in which a proximity sensitivity is changed.

The position information 1332 may be sensed through lattice type sensors 1311 and 1312 of the touch screen. The position information 1332 may include plane coordinates information on a position of the object (e.g., the hand).

Figure 14A:
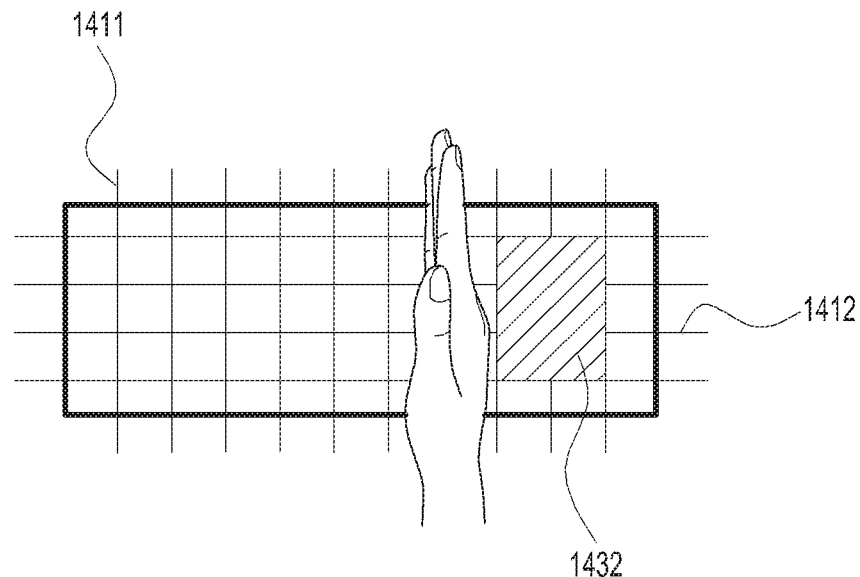
FIG. 14A is a plan view illustrating a touch screen sensing a movement of an object according to various embodiments of the present disclosure.
Figure 14B:
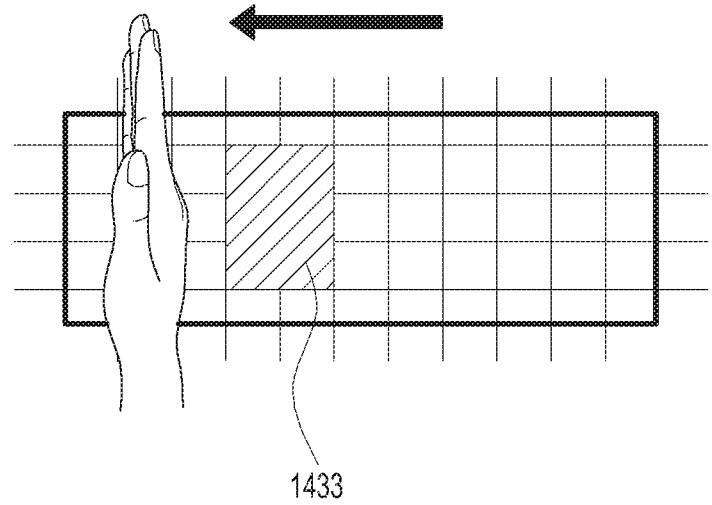
FIG. 14B is a plan view illustrating a touch screen sensing a movement of an object according to various embodiments of the present disclosure.

FIGS. 14A and 14B are plan views illustrating a touch screen sensing a movement of an object according to various embodiments of the present disclosure.

Referring to FIGS. 14A and 14B, according to various embodiments, an electronic device (or a processor) may sense position information of an object using a plurality of lattice type sensors 1411 and 1412. When an object (e.g., a hand) sensed at a first position 1432 (as illustrated in FIG. 14A) moves to a second position 1433 (as illustrated in FIG. 14B), the processor may sense the movement of the object (e.g., the hand) using the plurality of lattice type sensors 1411 and 1412 of the touch screen, and may recognize a gesture (e.g., a gesture in which the hand is moved from a right side to a left side) corresponding to the sensed movement of the object (e.g., the hand).

Figure 15:
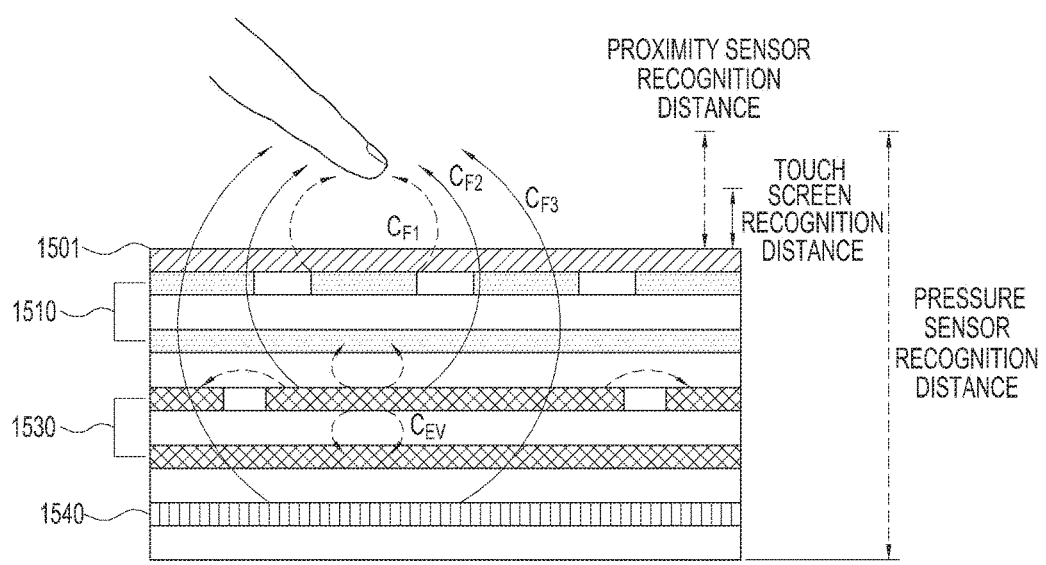
FIG. 15 is a cross-sectional view illustrating an electronic device in which a pressure sensor according to various embodiments of the present disclosure.

FIG. 15 is a cross-sectional view illustrating an electronic device in which a pressure sensor according to various embodiments of the present disclosure.

Referring to FIG. 15, according to various embodiments, the electronic device may further include a housing 1501, a touch screen 1510, a proximity sensor 1530 and a pressure sensor 1540.

The pressure sensor 1540 may be disposed in a lower area of the proximity sensor 1530. In addition, differently from FIG. 15, the pressure sensor may also be disposed between the proximity sensor 1530 and the touch screen 1510.

The pressure sensor 1540 may include a capacitive pressure sensor. The processor may sense an intensity (or a pressure) by an object approached on the housing 1501 using the capacitive pressure sensor, and may determine that the object approaches the electronic device when the intensity of an input by the object is larger than a predetermined intensity. The capacitive pressure sensor may be connected to a fifth electrode and a sixth electrode, and the processor may sense the intensity of the input by the object based on a change of a capacitance formed between the fifth electrode and the sixth electrode which are connected to both ends of the capacitive pressure sensor.

Figure 16A:
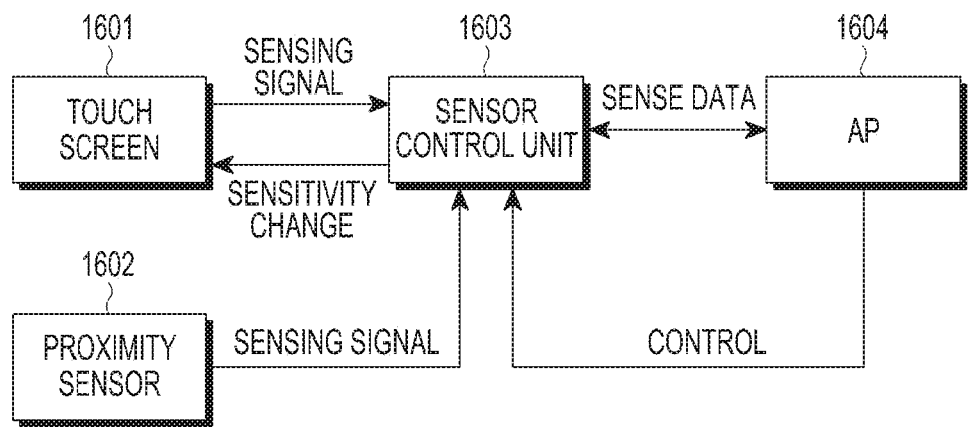
FIG. 16A is a block diagram illustrating an example of a detailed structure of a processor according to various embodiments of the present disclosure.

FIG. 16A is a block diagram illustrating an example of a detailed structure of a processor according to various embodiments of the present disclosure.

Referring to FIG. 16A, the processor of an electronic device may include a sensor control unit 1603 and an AP 1604.

According to various embodiments, the sensor control unit 1603 may be electrically connected to a touch screen 1601 and a proximity sensor 1602, and may be electrically connected to the AP 1604 of the electronic device. The sensor control unit 1603 may sense a proximity of an object based on a proximity sensor sensing signal received from the proximity sensor 1602, change a proximity sensitivity of the touch screen 1601 correspondingly to the sense of the proximity of the object, and receive a touch sensor sensing signal by the touch screen 1601 according to the changed proximity sensitivity. The sensor control unit 1603 may sense a movement of the object and a gesture of the object based on the received touch sensor sensing signal, and may transmit a result of the sense to the AP 1604 in a data type according to a control of the AP 1604.

Figure 16B:
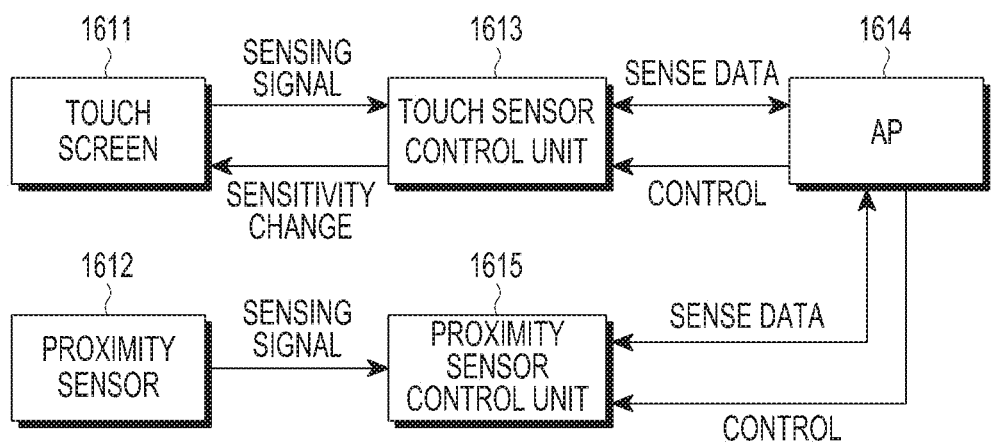
FIG. 16B is a block diagram illustrating a detailed structure of a processor according to various embodiments of the present disclosure.

FIG. 16B is a block diagram illustrating a detailed structure of a processor according to various embodiments of the present disclosure.

Referring to FIG. 16B, the processor of an electronic device may further include a touch sensor control unit 1613, an AP 1614 and a proximity sensor control unit 1615.

According to various embodiments, the proximity sensor control unit 1615 may be separate from the touch sensor control unit 1613 and may be included in the electronic device. The touch sensor control unit 1613 may be electrically connected to the touch screen 1611 and the AP 1614. The proximity sensor control unit 1615 may be electrically connected to the proximity sensor 1612 and the AP 1614. The proximity sensor control unit 1615 may receive a proximity sensor sensing signal for an object proximity, which is received from the proximity sensor 1612. When the proximity sensor sensing signal is received, the proximity sensor control unit 1615 may sense a proximity of the object based on the received sensing signal. When the proximity of the object is sensed, the proximity sensor control unit 1615 may transmit a result of the sense to the AP 1614 in a data type according to a control of the AP 1614.

An electronic device according to various embodiments of the present disclosure may comprise: a touch screen; a proximity sensor overlapping a portion of the touch screen to form an overlap area of the touch screen; and a processor configured to sense a proximity of an object located over the touch screen using the proximity sensor, change a proximity sensitivity of the overlap area of the touch screen, and sense a position of the object using the changed proximity sensitivity of the touch screen.

According to various embodiments, the processor increases a sense distance for the object of the overlap area of the touch screen up to a distance from the touch screen to the object.

According to various embodiments, the touch screen includes a plurality of touch sensors, and the processor obtains position information of the object using a signal from the plurality of touch sensors.

According to various embodiments, the processor obtains position information corresponding to a position of the approached object using the plurality of touch sensors.

According to various embodiments, the processor senses a movement of the object based on a change of the obtained position information of the object, and recognizes a gesture corresponding to the identified movement of the object.

According to various embodiments, the proximity sensor is located at an upper area or an edge of the touch screen.

According to various embodiments, the proximity sensor includes a proximity sensor having a type of a plurality of plates laminated and electrically connected with each other.

According to various embodiments, each proximity sensor of the plate type has an area corresponding to a sensitivity critical value which may be sensed by the processor.

According to various embodiments, the proximity sensor includes a capacitive proximity sensor, the processor obtains a change of a first capacitance according to a proximity of the object using the capacitive proximity sensor, and the processor senses the proximity of the object correspondingly to the obtained change of the first capacitance.

According to various embodiments, the touch screen includes a capacitive touch screen, the processor obtains a change of a second capacitance according to a proximity of the object using the capacitive touch screen, and the processor senses a position of the object correspondingly to the obtained change of the second capacitance.

According to various embodiments, the touch screen includes a capacitive touch screen, the processor obtains a difference between a second capacitance previously sensed before a proximity of the object and a third capacitance sensed after the proximity of the object, using the capacitive touch screen, and the processor senses a position of the object correspondingly to the obtained capacitance difference.

According to various embodiments, the electronic device further includes a pressure sensor overlapping a portion of the touch screen, and the processor senses a proximity of the object using a signal from the pressure sensor.

According to various embodiments, the pressure sensor is disposed between the touch screen and the proximity sensor or is disposed at a lower area of the proximity sensor.

According to various embodiments, an electronic device comprises: a housing including a first surface and a second surface opposite to the first surface; a display exposed through the first surface; a touch panel that is disposed between the display and the second surface, the touch panel including a first electrode and a second electrode, wherein the touch panel calculates plane coordinates of a user input to the display based on a change of a capacitance formed between the first electrode and the second electrode; and a capacitive sensor including a third electrode and a fourth electrode, the capacitive sensor measuring a proximity between an external object and the first surface of the housing based on a change of a capacitance formed between the third electrode and the fourth electrode.

According to various embodiments, the capacitive sensor is located on at least one of the display and the touch panel.

According to various embodiments, the capacitive sensor partially overlaps at least one of the display and the touch panel.

According to various embodiments, the capacitive sensor is disposed between at least a portion of the touch panel and the second surface.

According to various embodiments, the capacitive sensor is located at an edge of at least one of the display and the touch panel.

According to various embodiments, the capacitive sensor is adjacent to a side of the display and is adjacent to the first surface.

According to various embodiments, the electronic device further includes a processor that controls the touch panel, and the capacitive sensor is electrically connected to the processor.

According to various embodiments, the electronic device further includes a flexible printed circuit board (FPCB) layer including the display and the touch panel, wherein at least one of the third electrode and the fourth electrode is located on the FPCB layer.

According to various embodiments, the electronic device further includes a processor located on the FPCB layer, the processor configured to control the display and the touch panel.

According to various embodiments, the third electrode or the fourth electrode may be formed on a shield layer for shielding an electric field related to the display.

According to various embodiments, the third electrode or the fourth electrode is located on a plate different from a plate in which the display or the touch panel is included.

According to various embodiments, the third electrode or the fourth electrode is formed of a material of which a resistance is lower than that of the first electrode or the second electrode.

According to various embodiments, the third electrode or the fourth electrode is copper.

According to various embodiments, the first electrode or the second electrode is ITO or a silver nano wire.

According to various embodiments, the electronic device further includes a pressure sensor including a fifth electrode and a sixth electrode, the pressure sensor determining an intensity of a user input to the display based on a change of a capacitance formed between the fifth electrode and the sixth electrode.

According to various embodiments, the pressure sensor is adjacent to the capacitive sensor.

According to various embodiments, the pressure sensor is located between the display and the capacitive sensor.

According to various embodiments, the pressure sensor is located between the capacitive sensor and the second surface.

According to various embodiments, the fifth electrode or the sixth electrode is located on a layer on which the third electrode or the fourth electrode is located.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a compact disc ROM (CD-ROM) and a DVD), magneto-optical media (e.g., a floptical disk), a hardware device (e.g., a ROM, a RAM, a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added. Further, the embodiments disclosed in this document are only for the description and understanding of technical contents and do not limit the scope of the present disclosure. Therefore, it should be construed that all modifications and changes or modified and changed forms based on the technical idea of the present disclosure fall within the scope of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    a touch screen comprising a first plurality of electrodes;
    a proximity sensor comprising a second plurality of electrodes overlapping a portion of the touch screen to form an overlap area of the touch screen; and
    a processor configured to:
        sense a proximity of an object located over the touch screen using the proximity sensor,
        change a sensitivity of the first plurality of electrodes of the overlap area based on the proximity of the object sensed by the second plurality of electrodes, and
        sense a position of the object using the touch screen based on the changed sensitivity of the first plurality of electrodes.

2. An electronic device comprising:
    a housing including a first surface and a second surface opposite to the first surface;
    a display exposed through the first surface;
    a touch panel that is disposed between the display and the second surface, the touch panel including a first electrode and a second electrode, wherein the touch panel calculates plane coordinates of a user input to the display based on a change of a capacitance formed between the first electrode and the second electrode; and
    a capacitive sensor that partially overlaps the touch panel, the capacitive sensor including a third electrode and a fourth electrode,
    wherein the capacitive sensor measures a proximity between an external object and the first surface of the housing based on a change of a capacitance formed between the third electrode and the fourth electrode.

3. The electronic device of claim 2, wherein the capacitive sensor is located on at least one of the display and the touch panel.

4. The electronic device of claim 2, wherein the capacitive sensor is disposed between at least a portion of the touch panel and the second surface.

5. The electronic device of claim 2, wherein the capacitive sensor is located at an edge of at least one of the display and the touch panel.

6. The electronic device of claim 5, wherein the capacitive sensor is adjacent to the display and the first surface of the housing.

7. The electronic device of claim 2, further comprising:
    a processor that controls the touch panel,
    wherein the capacitive sensor is electrically connected to the processor.

8. The electronic device of claim 2, further comprising:
    a flexible printed circuit board (FPCB) layer including the display and the touch panel,
    wherein at least one of the third electrode and the fourth electrode is located on the FPCB layer.

9. The electronic device of claim 5, further comprising:
    a processor located on the FPCB layer, the processor configured to control the display and the touch panel.

10. The electronic device of claim 2, wherein at least one of the third electrode and the fourth electrode is formed on a shield layer, the shield layer for shielding an electric field related to the display.

11. The electronic device of claim 2, wherein the display and the touch panel are located on a first plate, and at least one of the third electrode and the fourth electrode is located on a second plate.

12. The electronic device of claim 2, wherein at least one of the third electrode and the fourth electrode forms a resistance lower than that of the first electrode or the second electrode.

13. The electronic device of claim 12, wherein at least one of the third electrode and the fourth electrode is formed of copper.

14. The electronic device of claim 12, wherein at least one of the first electrode and the second electrode is formed of indium tin oxide (ITO) or a silver nano wire.

15. The electronic device of claim 2, further comprising:
    a pressure sensor including a fifth electrode and a sixth electrode, the pressure sensor determining an intensity of a user input to the display based on a change of a capacitance formed between the fifth electrode and the sixth electrode.

16. The electronic device of claim 15, wherein the pressure sensor is adjacent to the capacitive sensor.

17. The electronic device of claim 16, wherein the pressure sensor is located between the display and the capacitive sensor.

18. The electronic device of claim 16, wherein the pressure sensor is located between the capacitive sensor and the second surface.

19. The electronic device of claim 15, wherein at least one of the fifth electrode and the sixth electrode is located on a layer on which at least one of the third electrode and the fourth electrode is located.

* * * * *